(12) United States Patent
Beer-Gingold et al.

(10) Patent No.: US 8,345,155 B2
(45) Date of Patent: Jan. 1, 2013

(54) INTEGRATED CIRCUIT COMPRISING DEFLICKER UNIT FOR FILTERING IMAGE DATA, AND A METHOD THEREFOR

(75) Inventors: Shlomo Beer-Gingold, Guivat Shmuel (IL); Eyal Rabia, Tel Aviv (IL); Michael Zarubinsky, Rishon Lezion (IL)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 13/142,281

(22) PCT Filed: Jan. 21, 2009

(86) PCT No.: PCT/IB2009/050217
§ 371 (c)(1),
(2), (4) Date: Jun. 27, 2011

(87) PCT Pub. No.: WO2010/084380
PCT Pub. Date: Jul. 29, 2010

(65) Prior Publication Data
US 2012/0086852 A1    Apr. 12, 2012

(51) Int. Cl.
*H04N 7/01*    (2006.01)
*H04N 11/20*    (2006.01)
(52) U.S. Cl. ..................... 348/447; 348/441
(58) Field of Classification Search .......... 348/441, 348/447, 443, 458, 459, 607, 624, 446, 448, 348/445; 382/260–264; H04N 7/01, 11/20, H04N 5/21
See application file for complete search history.

(56) References Cited

U.S. PATENT DOCUMENTS

| | | | |
|---|---|---|---|
| 5,136,385 A | 8/1992 | Campbell | |
| 5,822,008 A * | 10/1998 | Inoue et al. | 348/447 |
| 5,894,330 A | 4/1999 | Huang et al. | |
| 6,094,226 A | 7/2000 | Ke et al. | |
| 7,061,537 B2 | 6/2006 | Lee | |
| 2002/0113899 A1 | 8/2002 | Swan | |
| 2003/0174247 A1 | 9/2003 | Lee et al. | |
| 2008/0101720 A1* | 5/2008 | Wang | 382/275 |

FOREIGN PATENT DOCUMENTS

EP    0751682 B1    8/2003
JP    2004241987 A   8/2004

OTHER PUBLICATIONS

International Search Report and Written Opinion correlating to PCT/IB2009/050217 dated Jun. 15, 2009.

* cited by examiner

*Primary Examiner* — Sherrie Hsia (57) ABSTRACT

An integrated circuit comprises deflicker unit is described for adaptively applying deflicker filtering to image data to be displayed using an interlaced scan line technique. The deflicker unit comprises analysis unit arranged to receive the image data and identify at least one region of an image to which deflicker filtering is to be applied, and filter arranged to apply deflicker filtering to those regions identified by the analysis unit. In one example, the analysis unit may be arranged to identify regions of the image to which deflicker filtering is to be applied based at least on energy levels for a high frequency range component within the vertical frequency domain of the image data.

20 Claims, 5 Drawing Sheets

INTEGRATED CIRCUIT COMPRISING DEFLICKER UNIT FOR FILTERING IMAGE DATA, AND A METHOD THEREFOR

FIELD OF THE INVENTION

The field of this invention relates to an integrated circuit comprising deflicker unit for filtering image data and a method therefor, and in particular to deflicker unit for adaptively applying deflicker filtering to image data for an image to be displayed using an interlaced scan line technique and a method therefor.

BACKGROUND OF THE INVENTION

In the field of this invention, it is known for television systems and the like to use an interlaced scan line technique in order to minimise the signal bandwidth used. With the interlaced scan line technique, an image is displayed as two scan line fields; one scan line field comprising the odd horizontal lines of the image; and the second scan line field comprising the even horizontal lines of the image. In this manner, odd and even scan line fields of images are alternately displayed, for example at a rate of 60 fields per second for NTSC (National Television System Committee) systems and at a rate of 50 fields per second for PAL (Phase Alternating Line) systems.

A common problem with using the interlaced scan line technique is that alternating the display of odd and even lines can result in flickering of the image. Flickering can be seen as an aliasing phenomenon, and is the effect caused when high frequency image energy aliases to low frequency image energy, thereby resulting in low frequency flicker where high spatial vertical frequencies are present. Flickering is most visible on cathode ray tube (CRT) monitors, due to luminescence fading of even horizontal lines of the image of the phosphor coating. The root cause of flickering is vertical modulation of an image caused by the fading of the phosphor coating, which leads to aliasing.

To avoid such flickering, it is known to use a vertical image filter, commonly known as a 'flicker filter'. A flicker filter effectively attenuates the values of vertically adjacent pixels to decrease the difference between adjacent odd and even lines, and thus reduce the flickering effect. However, a problem with such flicker filters is that they also significantly decrease the vertical resolution of an image, causing blurring.

SUMMARY OF THE INVENTION

The present invention provides an integrated circuit comprising deflicker unit, an electronic device comprising such deflicker unit and a method therefor as described in the accompanying claims.

Specific examples of the invention are set forth in the dependent claims.

These and other aspects of the invention will be apparent from, and elucidated with reference to, the examples described hereinafter.

BRIEF DESCRIPTION OF THE DRAWINGS

Further details, aspects and examples of the invention will be described, by way of example only, with reference to the drawings. Elements in the figures are illustrated for simplicity and clarity and have not necessarily been drawn to scale.

DETAILED DESCRIPTION

A common problem with using an interlaced scan line technique for displaying an image on, for example, a television display is that alternating the display of odd and even lines can result in flickering of the image. Flickering can be seen as an aliasing phenomenon, and is the effect caused when high frequency image energy aliases to low frequency image energy, thereby resulting in low frequency flicker where high spatial vertical frequencies are present. This aliasing phenomenon may be represented mathematically using Equation 1 below:

$$Im\_tv(x) = Im\_in(x)(f1(x) \cdot m1(x) + f2(x) \cdot m2(x)) \quad \text{[Equation 1]}$$

Im_tv represents the displayed image as viewed, and Im_in represents the original image. From Equation 1, we can see that the displayed image as viewed (Im_tv) may be represented as the original image (Im_in) multiplied by an even line component comprising the functions f1 and m1, and an odd line component comprising the functions f2 and m2.

Figure 1:
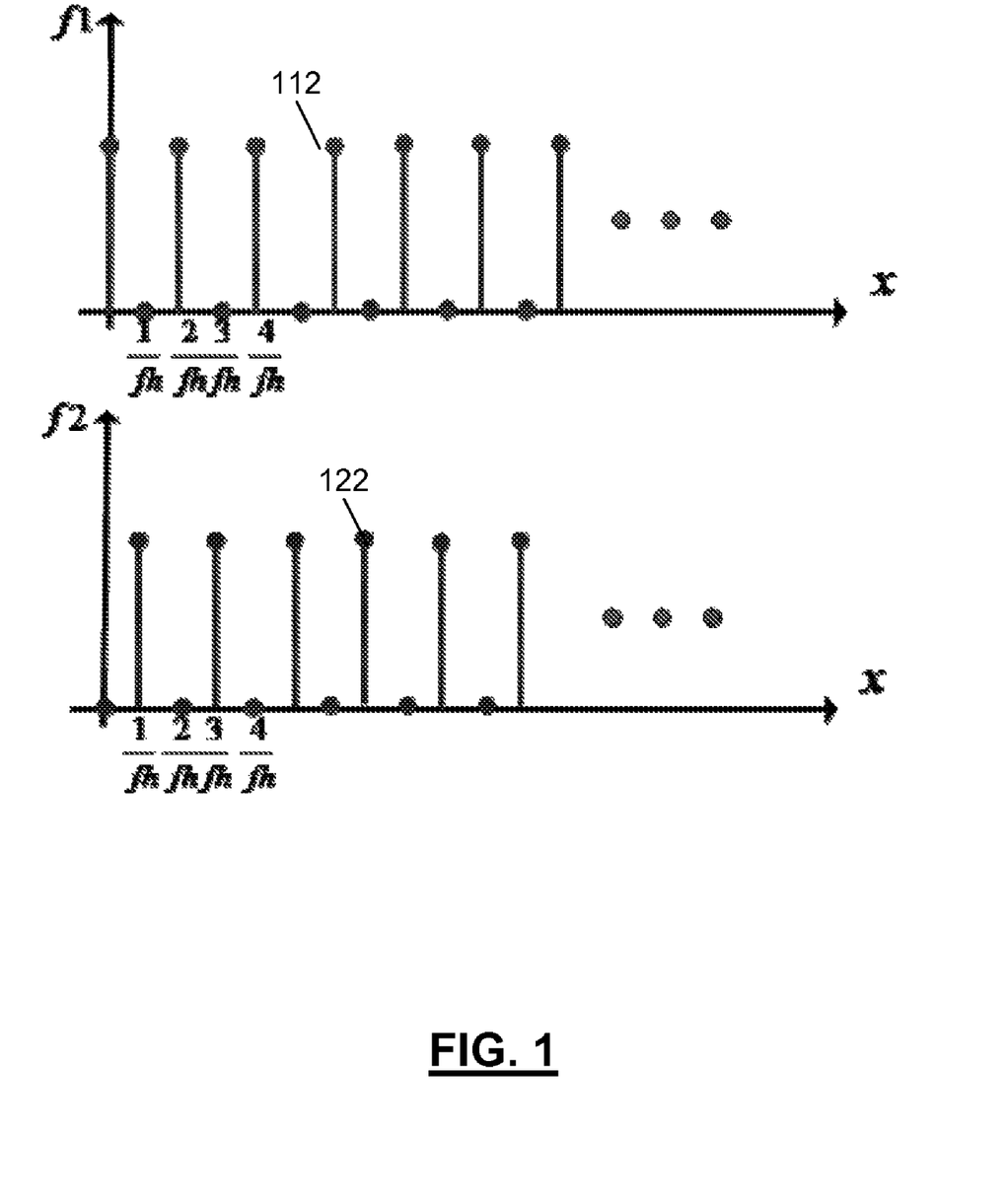
FIG. 1 illustrates examples of mathematical representations of delta train functions for even and odd lines of an image displayed using an interlaced scan line technique.

FIG. 1 graphically illustrates examples of mathematical representations for the functions f1 and f2, where the functions f1 and f2 comprise delta train functions 112, 122 for the even and odd lines respectively, and where fh represents the line frequency. In this manner, the displayed image as viewed (Im_tv) is a composition of even and odd fields.

Figure 2:
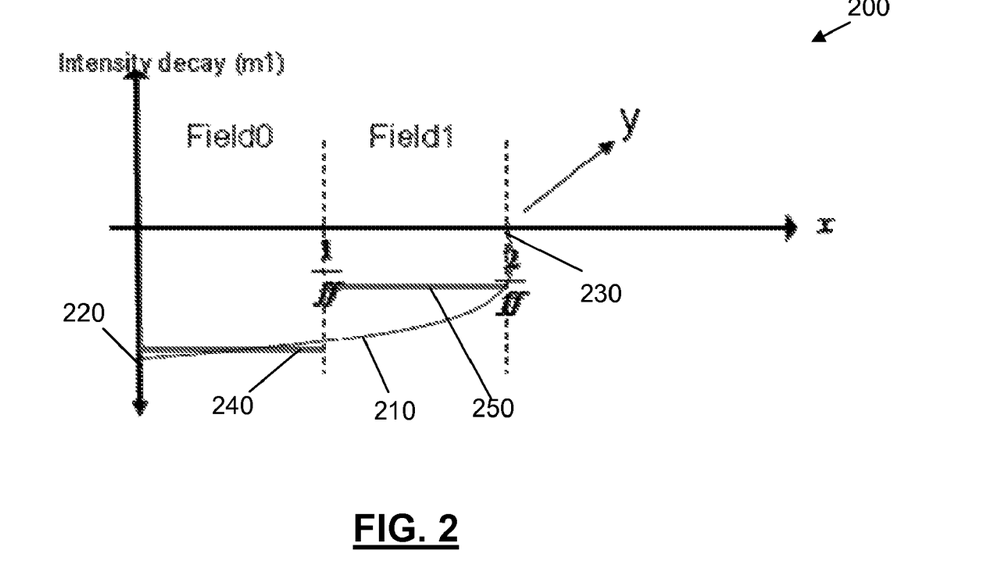
FIG. 2 illustrates an example of a graph showing spatial intensity decay of an image displayed using an interlace scan line technique.

The functions m1 and m2 of Equation 1 represent the intensity decay of pixels within the image. FIG. 2 illustrates an example of a graph 200 showing the intensity decay 210 represented by the function m1, where ff represents the field frequency. As can be seen, the decay of the intensity is exponential, with the point 230 marked as y where the intensity degradation is at its minimum (e.g. zero), corresponding to the spatial coordinate in the image where, in the case of a cathode ray tube (CRT) display, the cathode ray is pointed at that moment in time. The point 220, where the intensity degradation is at its maximum, corresponds to the spatial coordinate in the image for the next pixel in the same field to which, again in the case of a CRT display, the cathode ray is to point at next. The intensity decay for pixels in the odd line field (Field 1) will be substantially the same as that for pixels in the even line field (Field 0). Thus, the intensity decay of the odd line field (represent in Equation 1 by function m2) is substantially the same as the intensity decay of the even line field (represented in Equation 2 by function m2), but shifted a field.

Referring back to Equation 1 above, by applying algebraic operations thereto, Equation 1 may be rewritten as Equation 2 below:

$$Im\_tv(x) = Im\_in(x)(1+f(x) \cdot m(x)) \quad \text{[Equation 2]}$$

Figure 3:
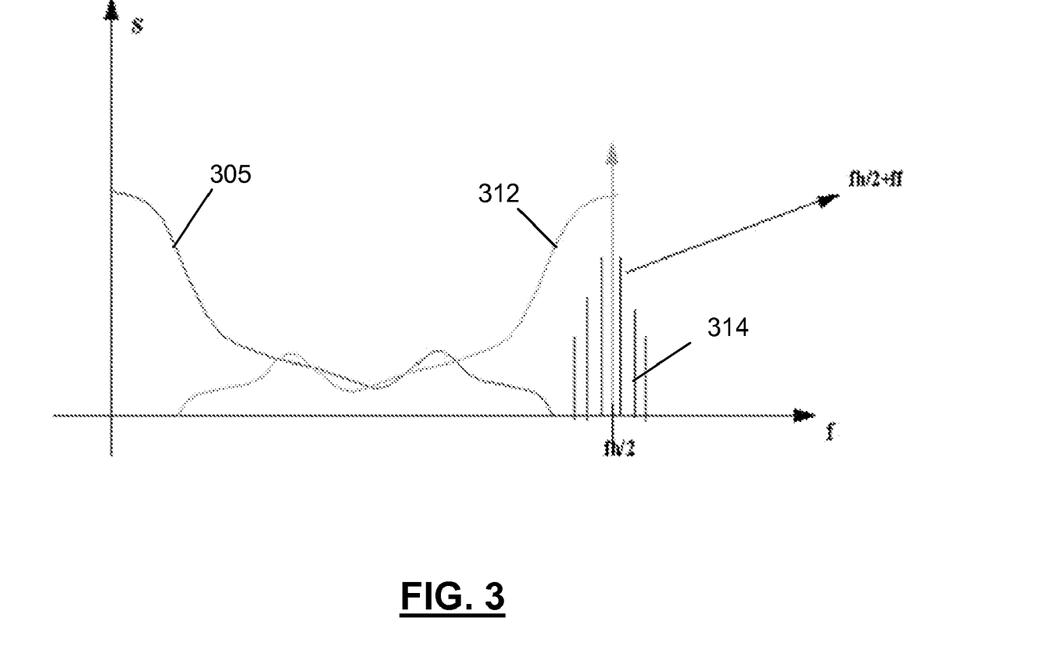
FIG. 3 illustrates an example of a graph showing the components of a Fourier Transform of a spatial frequency domain of an image displayed using an interlace scan line technique.

As previously mentioned, the decay of the intensity is exponential. However, the decay within each field may be approximated into two substantially constant lines 240, 250, one representative of each field's decay. By applying a Fourier Transform to Equation 2, we obtain a frequency domain representation given in Equation 3 below:

$$Im\_in(f_x) + (Im\_in(f_x) \otimes F(f_x) \otimes M(f_x)) \quad \text{[Equation 3]}$$

where $Im\_in(f_x)$ represents the vertical spectrum of the image, $F(f_x)$ represents the spectrum aliasing due to vertical flickering, and $M(f_x)$ the low frequency distortions due to intensity field change. Significantly, Equation 3 is a spatial representation, as opposed to a timing representation. Accordingly, it provides a representation of the aliasing in the spatial spectrum of in image. FIG. 3 illustrates an example of a graph showing the components $Im\_in(f_x)$ 305, $F(f_x)$ 312, and $M(f_x)$ 314 of the Fourier Transform of Equation 3. As can be seen, the spectrum aliasing component 312 and low frequency distortion component 314 are most significant at higher frequency values. As a result, flickering is typically most prevalent when the energy level for a high frequency range component within the vertical frequency domain of the image is high. It is worth noting that if the energy levels for the mid range frequency components are high compared to those for the high range frequency components, the flickering effect will be reduced.

Figure 4:
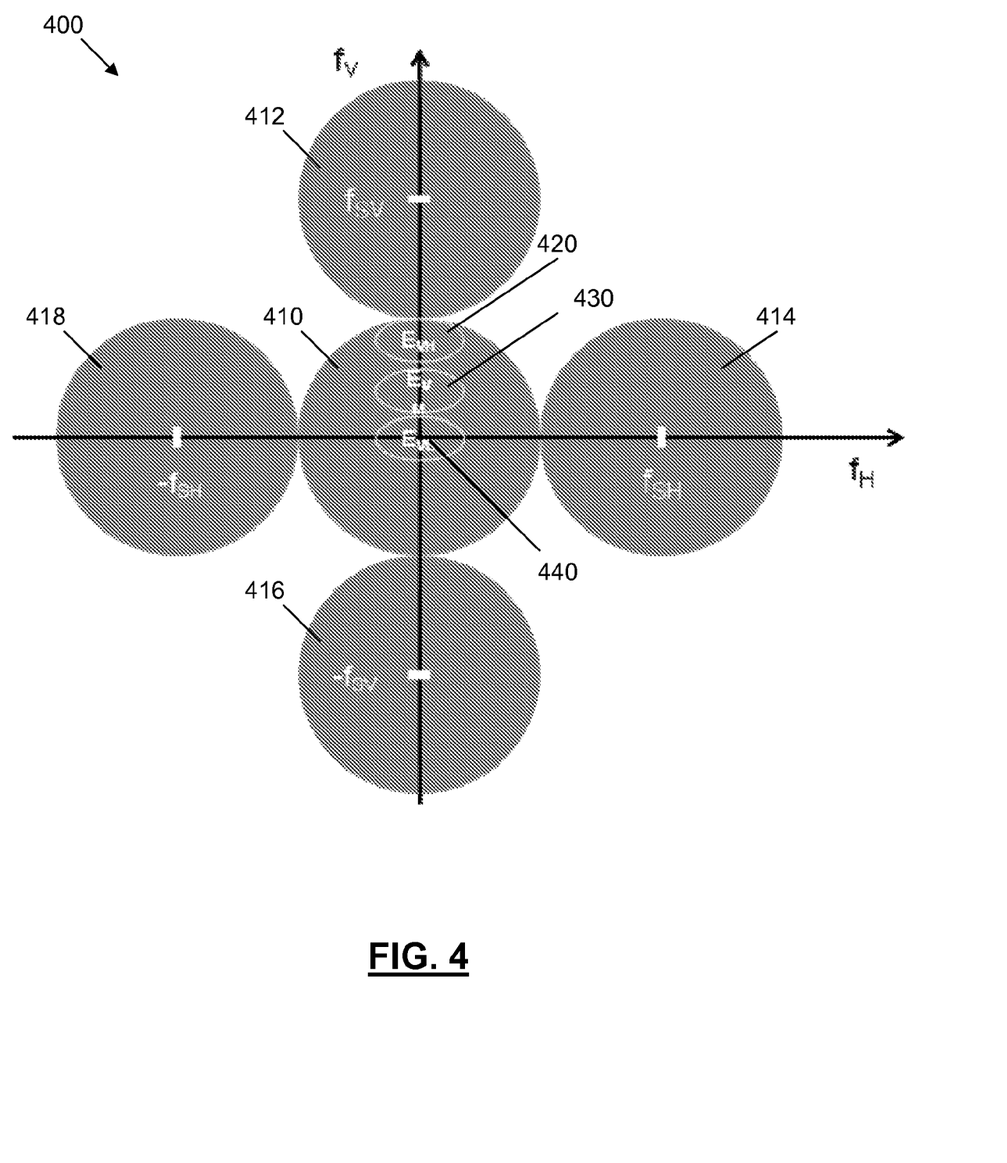
FIG. 4 illustrates an example of a two dimensional spectral power distribution for an image.

Referring now to FIG. 4, there is illustrated an example of a two dimensional spectral power distribution 400 for an image, with vertical frequency components represented on the y-axis and horizontal frequency components represented on the x-axis. The power distribution for the actual image 410 is illustrated substantially about the origin. Aliases 412, 414, 416, 418 of the actual image due to sampling are illustrated substantially at +/− the vertical and horizontal sampling frequencies +/−$f_{SV}$ and +/−$f_{SH}$.

As previously mentioned, a common problem with using the interlaced scan line technique is that alternating the display of odd and even lines can result in flickering of the image. Typically, flickering is visible if the energy level for a high frequency range component ($E_{VH}$) 420 within the vertical frequency domain of the image is high, and if the energy levels for a mid frequency range component ($E_{VM}$) 430, which tend to mask flickering, are low. In addition, if the energy levels for a low frequency range component ($E_{VL}$) 440 within the vertical frequency domain of the image are low, they will tend to be affected by aliasing. For example, a low frequency component may comprise a range of, say, between 0 and $f_{SV}/6$, a mid frequency component may comprise a range of, say, between $f_{SV}/6$ and $f_{SV}/3$, and a high frequency component may comprise a range of, say, between $f_{SV}/3$ and $f_{SV}/2$. It will be appreciated that these frequency ranges are only examples of possible frequency ranges, and alternative frequency ranges may be used to divide the frequency spectrum into different regions. Furthermore, examples of the invention are not limited to high, mid and low frequency components, nor are they limited to equi-distant spacing of ranges.

Figure 5:
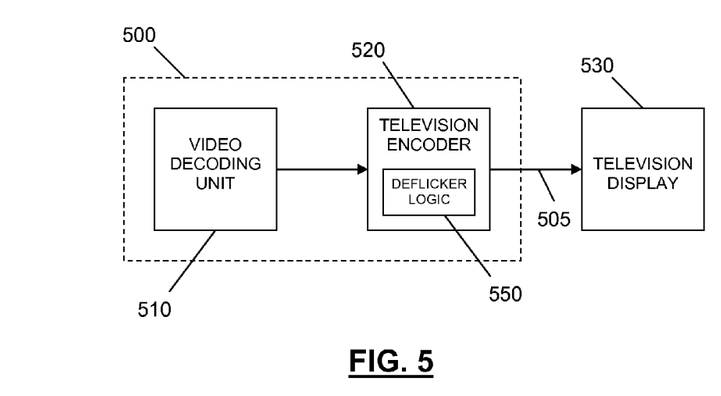
FIG. 5 illustrates an example of an electronic device adapted in accordance with some embodiments of the invention.

Referring now to FIG. 5, there is illustrated an example of an electronic device 500. In particular, the electronic device 500 of FIG. 5 is arranged to output a signal 505 comprising data that is representative of an image to be displayed using an interlaced scan line technique. For example, the signal 505 may be intended for receipt by a display device, which for the illustrated example comprises a television display 530. The electronic device 500 comprises deflicker unit 550 for adaptively applying deflicker filtering to image data for an image to be displayed, which for the illustrated example forms a part of a television encoder 520 operably coupled to a video decoding unit 510 arranged to obtain video encoded information from, say a memory element (not shown) and to send decoded video information to the television encoder 520. The television encoder may alternatively be arranged to receive video information from a CPU (Central Processing Unit) or other signal processing device. Although in the illustrated example the electronic device 500 comprises the deflicker unit 550 in a form of a separate device to the display device 530, it is contemplated that the deflicker unit 550 may alternatively form an integral part of the display device 530.

Figure 6:
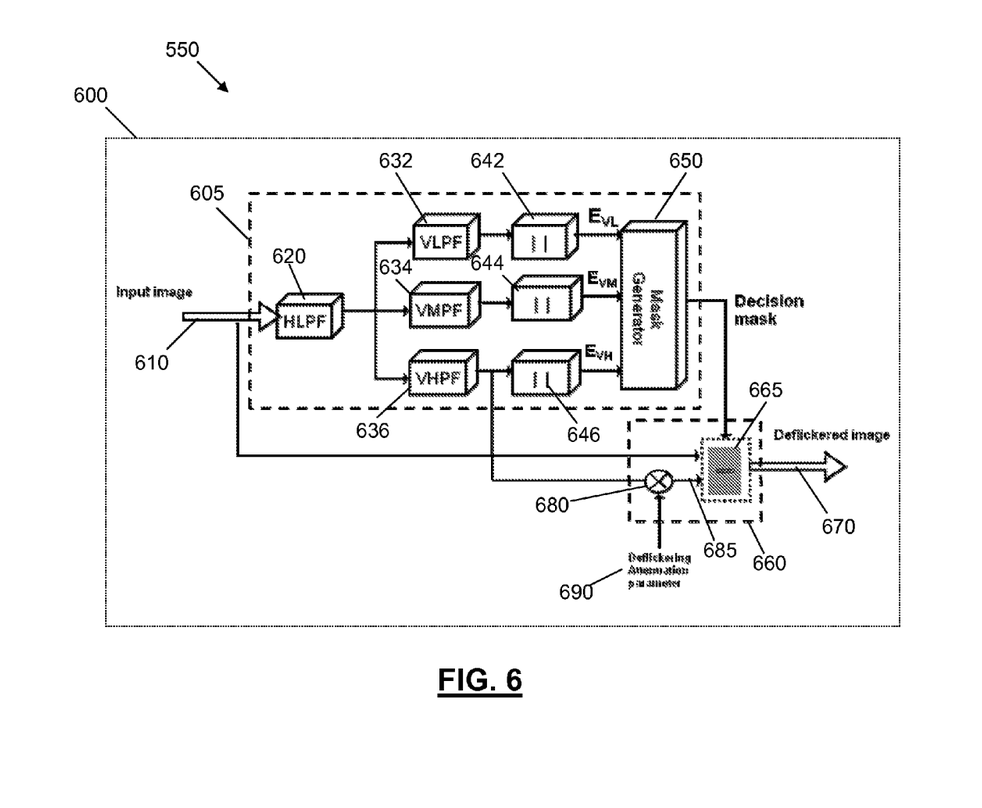
FIG. 6 illustrates an example of an integrated circuit comprising deflicker unit according to some embodiments of the invention.

Referring now to FIG. 6, there is illustrated an example of an integrated circuit 600 comprising deflicker unit 550. For the illustrated example, the deflicker unit 550 comprises analysis unit 605 arranged to receive image data 610 for an image to be displayed using an interlaced scan line technique, and to identify regions of the image to which deflicker filtering is to be applied. The deflicker unit 550 further comprises filter 660 arranged to apply deflicker filtering to those regions identified by the analysis unit 605.

For the example illustrated in FIG. 6, the analysis unit 605 is arranged to identify regions of the image to which deflicker filtering is to be applied based at least on energy levels for a high frequency range component within the vertical frequency domain of the image data 610. In this manner, regions of the image comprising high energy levels within the high frequency ranged component of the vertical frequency domain, and thus the regions that are prone to flickering, may be identified, and have deflicker filtering applied thereto. As a result, the deflicker filtering may be adaptively applied to those regions of the image that are prone to flickering, whilst other regions not prone to flickering may be left un-filtered. Thus, flickering of an image may be substantially reduced, since only those regions that are prone to flickering are filtered. Furthermore, the decrease in vertical resolution of the image is reduced compared with traditional filtering techniques, since filtering may be applied locally to only those regions prone to flickering.

For the example illustrated in FIG. 6, the analysis unit 605 comprises a vertical high-pass filter 636 arranged to filter the image data 610 and thereby produce a signal that is representative of the high frequency range component within the vertical frequency domain of the image data 610. The analysis unit 605 may further comprise comparison unit 646 arranged to receive the signal that is representative of the high frequency range component within the vertical frequency domain of the image data 610, and to compare energy levels for the high frequency range component within the vertical frequency domain of the image data 610 to a threshold value. In this manner, if the energy levels for the high frequency range component exceed the threshold value, it may be determined that the corresponding region of the image may be prone to flickering.

The analysis unit 605 illustrated in FIG. 6 further comprises a vertical mid-pass filter 634, arranged to filter the image data 610 and thereby produce a signal that is representative of a mid frequency range component within the vertical frequency domain of the image data 610. Comparison unit 644 may be arranged to compare energy levels for the mid frequency range component within the vertical frequency domain of the image data 610 to a threshold value. In this manner, if the energy levels for the mid frequency range component are below this threshold value, it may be determined that the low energy levels within the mid frequency range are insufficient to mask flickering, and thus that the corresponding region of the image may be prone to flickering.

In this example, the analysis unit 605 may further comprise a vertical low-pass filter 632 arranged to filter the image data 610 to produce a signal that is representative of a low frequency range component within the vertical frequency domain of the image data 610. Comparison unit 642 may be arranged to compare energy levels for the low frequency range component within the vertical frequency domain of the image data 610 to a threshold value. In this manner, if the energy levels for the low frequency range component are below this threshold value, it may be determined that the low energy levels within the low frequency range mean that the corresponding region of the image is prone to interference from aliasing and flickering.

In accordance with a further example, the thresholds with which the energy levels for the frequency range components within the vertical frequency domain of the image data are compared may be based on an average energy level for the respective frequency range component throughout the image as a whole. Such average energy levels may be for the entire image. Alternatively, since flickering may be considered as a local effect, it is contemplated that such average energy levels may be for a local block within the image, thereby enabling the calculation of thresholds to be performed locally. Table 1 below illustrates an example of such thresholds with which the energy levels for the high, mid and low frequency range components within the vertical frequency domain of the image data may be compared.

TABLE 1

| High frequency range component | 2.0* average high frequency vertical energy level for image |
|---|---|
| Mid frequency range component | 0.9* average mid frequency vertical energy level for image |
| Low frequency range component | 0.4* average low frequency vertical energy level for image |

It is envisaged that for some alternative examples the thresholds with which the energy levels for the frequency range components within the vertical frequency domain of the image data are compared may be configurable, or otherwise may be varied depending on, say, the intensity of the image, and/or on specific properties or scenarios for the image content, for example if the image relates to, say, a sporting event, landscape, portrait, surveillance, etc. Table 2 below illustrates an example of such thresholds with which the energy levels for the high, mid and low frequency range components within the vertical frequency domain of the image data may be compared, whereby for the illustrated example the thresholds are dependent on the local intensity of the relevant region of the image.

TABLE 2

|  | Local intensity > 128 | Local intensity < 128 |
|---|---|---|
| High freq. cmpnt. | 2.0* ave. high freq energy | 1.0* ave. high freq energy |
| Mid freq. cmpnt. | 0.9* ave. mid freq energy | 0.4* ave. mid freq energy |
| Low freq. cmpnt. | 0.4* ave. low freq energy | 0.2* ave. low freq energy |

For the example illustrated in Table 2, the value '128', against which the local intensity is compared, relates to the mid-value of an 8-bit (0 to 255) scale used to describe images in YCbCr component format, where Y is the luma component and Cb and Cr are the blue-difference and red-difference chroma components respectively.

The vertical filters 632, 634, 636 may comprise non-complimentary filters, and in particular may be orthogonal, thereby enabling a better separation for the frequency range components within the vertical frequency domain. In this manner, the frequency separation for the different components may be optimised for human visual senses. In addition, the vertical filters 632, 634, 636 may comprise linear or median filters.

The analysis unit 605 may further comprise mask generator unit 650 arranged to generate deflicker mask information for the image to be displayed. In one example, the deflicker mask information may be based at least on the energy levels for the high frequency range component within the vertical frequency domain of the image data 610, and the mask generator unit 650 may be arranged to provide the deflicker mask information to the filter 660. In this manner, filter 660 may be arranged to apply deflicker filtering to the image data 610 in accordance with the received deflicker mask information. In particular, for the illustrated example, the mask generator unit 650 may be arranged to receive from comparison unit 646 an indication of whether the energy levels for the high frequency range component within the vertical frequency domain of the image data 610 exceed the respective threshold value. The mask generator unit 650 of the illustrated example may be further arranged to receive from both comparison unit 644 and comparison unit 642 indications of whether the energy levels for the mid and low frequency range components within the vertical frequency domain of the image data 610 exceed their respective threshold values. In this manner, the mask generator unit 650 may be able to generate deflicker mask information based on energy levels for the high, mid and low frequency range components within the vertical frequency domain of the image data 610.

For example, the mask generator unit 650 may be arranged to generate deflicker mask information, whereby regions of the image are 'masked' (i.e. arranged not to be filtered by filter 660) when:

energy levels for the high frequency range component within the vertical frequency domain of the image data do not exceed their respective threshold; and/or energy levels for the mid frequency range component within the vertical frequency domain of the image data exceed their respective threshold; and/or energy levels for the low frequency range component within the vertical frequency domain of the image data exceed their respective threshold.

In this manner, the mask generator unit 650 may generate deflicker mask information for controlling those regions of the image that are filtered by filter 660 based on energy levels within the vertical frequency domain of the image data. It is envisaged that the parameters with which the mask generator unit 650 generates the deflicker mask information may be configurable, for example depending on the overall intensity of the image, and/or on specific properties or scenarios for the image content, for example if the image relates to, say, a sporting event, landscape, portrait, surveillance, etc.

The analysis unit 605 for the illustrated example may further comprise horizontal low-pass filter unit 620 arranged to horizontally low-pass filter the image data 610 prior to the filtering performed by the vertical filters 632, 634, 636. In this manner, since flickering is typically less visible in regions with horizontal high frequency energy, regions of the image comprising horizontal high frequency energy components are substantially filtered out. As such, filtering of such regions by filter 660 may be masked, irrespective of the vertical frequency energy components. Thus, unnecessary filtering of the image data may be further avoided.

In one example, the filter 660 may be arranged to subtract an attenuated high frequency range component 685 from the image data 610 for those regions of the image to which deflicker filtering is to be applied, as identified by the analysis unit 605. In particular, for the illustrated example, the filter 660 may comprise mixer unit 680 arranged to mix a deflickering attenuation parameter 690 to the high frequency range component produced by the vertical high-pass filter 636, thereby generating the attenuated high frequency range component 685. The filter 660 further may comprise subtraction unit 665 arranged to selectively subtract the attenuated high frequency range component from the image data 610 in accordance with the deflicker mask information generated by the mask generator unit 650. In this manner, the subtraction unit 665 may apply deflicker filtering to those regions identified within the deflicker mask information as being prone to flickering, by subtracting from the image data 610 for those regions the attenuated high frequency range component 685 generated by the mixer unit 680. As a result, the filter 660 may output filtered image data 670 whereby only those regions identified as being prone to flickering have been filtered. Thus, any subsequent display of the image data 670 by way of the interlaced scan line technique may be substantially reduced or potentially free of flickering, whilst the decrease in vertical resolution of the image may also be reduced compared with traditional filtering techniques.

Equation 4 below illustrates an example of a mathematical representation of the filtered image data 670 (Im_out) output by the filter 660:

$$Im\_out = Im\_in - Im\_in \otimes HLPF \otimes VHPF \cdot K \cdot DAP \quad \text{[Equation 4]}$$

where: DAP is the deflickering attenuation parameter 690, K is determined by the deflicker mask information for the relevant region of the image (K can be equal to 0 such that Im_out=Im_in or can be equal to 1).

Figure 7:
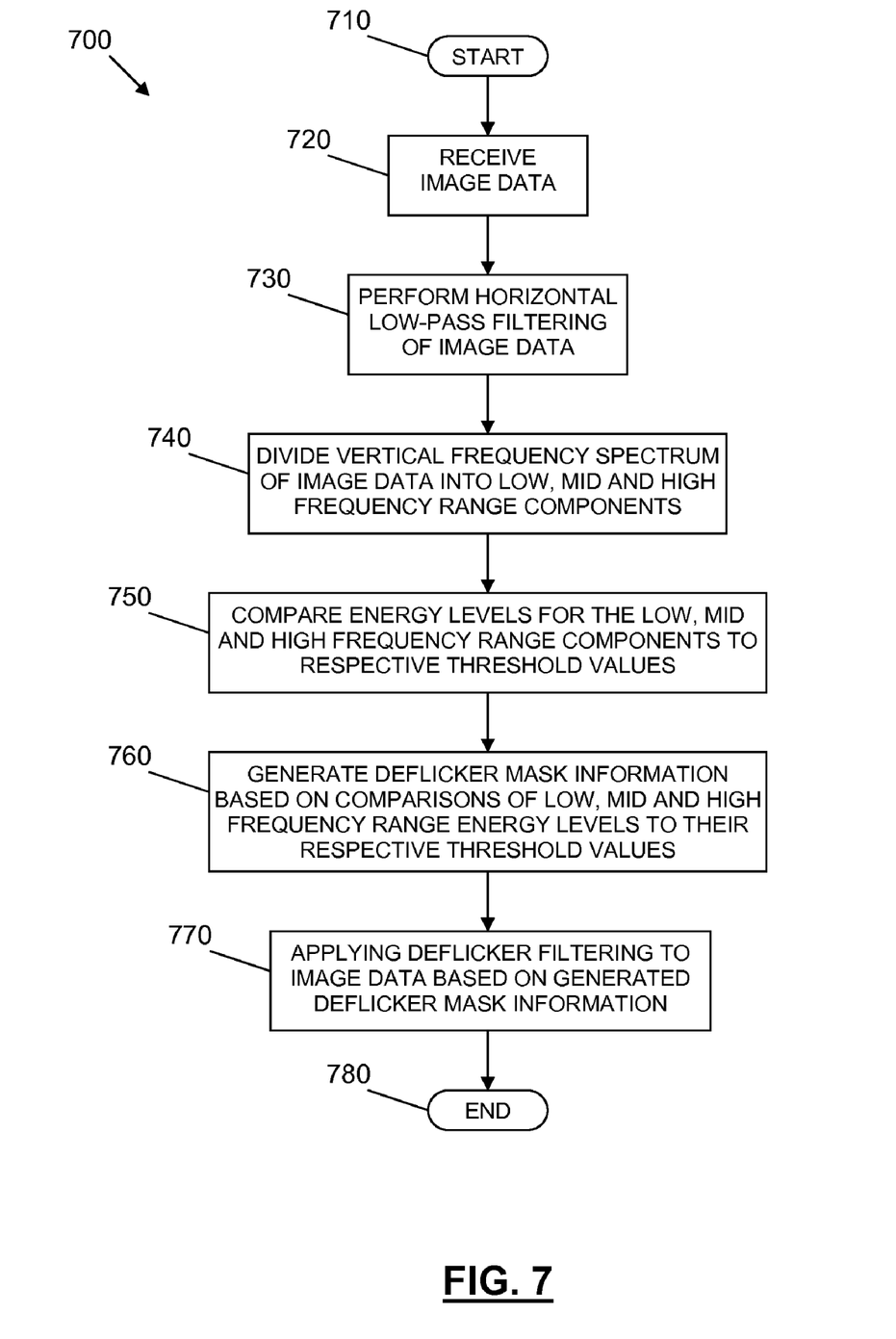
FIG. 7 illustrates an example of a simplified flowchart of a method for adaptively applying deflicker filtering to image data according to some embodiments of the invention.

Referring now to FIG. 7, there is illustrated an example of a simplified flowchart 700 of a method for adaptively applying deflicker filtering to image data for an image to be displayed using an interlaced scan line technique. The method comprises the steps of identifying regions of the image to which deflicker filtering is to be applied, and applying deflicker filtering to the identified regions; wherein the regions of the image to which deflicker filtering is to be applied may be identified based at least on energy levels for a high frequency range component within the vertical frequency domain of the image data.

More specifically, for the illustrated example, the method starts at step 710, and moves to step 720 where image data is received. Next, in step 730, horizontal low-pass filtering of the image data is performed. For the illustrated example, the method then moves on to step 740, where the vertical frequency spectrum of the image data is divided into, for example, individual low, mid and high frequency range components. The energy levels for the individual frequency range components are then compared to respective threshold values, in step 750. Next, in step 760, deflicker mask information is generated based on the comparisons of the energy levels for the individual frequency range components and their respective threshold values in step 750. Deflicker filtering is then applied to the image data based on the deflicker mask information, in step 770, such that only those regions of the image data that may be prone to flickering are filtered. The method then ends at step 780.

It will be understood that the examples herein described and illustrated in the accompanying drawings may provide an improved method and apparatus for applying deflicker filtering to image data, for an image to be displayed using an interlaced scan line technique. In particular, flickering within the displayed image may be reduced whilst the decrease in vertical resolution of the image may also be reduced compared with traditional filtering techniques, since filtering may be applied locally to only those regions that may be prone to flickering. Furthermore, examples hereinbefore described may enable unnecessary filtering of regions within the image, which are not prone to flickering, to be substantially avoided. In addition, examples hereinbefore described may support accurate identifying of regions that may be prone to flicker, for example based on energy levels for at least a high frequency range component within the vertical frequency domain of the image data. For some examples, the regions may be identified based on energy levels for high, mid and low frequency range components within the vertical frequency domain of the image data. Also, examples hereinbefore described may support configurable analysis of image data, such as configurable thresholds with which energy levels for frequency range components may be compared and/or configurable generation of deflicker mask information, enabling the identification of regions requiring deflicker filtering to be configurable.

The invention may be implemented in a computer program for running on a computer system, at least including code portions for performing steps of a method according to the invention when run on a programmable apparatus, such as a computer system or enabling a programmable apparatus to perform functions of a device or system according to the invention. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system. The computer program may be provided on a data carrier, such as a CD-ROM or diskette, stored with data loadable in a memory of a computer system, the data representing the computer program. The data carrier may further be a data connection, such as a telephone cable or a wireless connection.

In the foregoing specification, the invention has been described with reference to specific examples of embodiments of the invention. It will, however, be evident that various modifications and changes may be made therein without departing from the broader scope of the invention as set forth in the appended claims. For example, the connections may be any type of connection suitable to transfer signals from or to the respective nodes, units or devices, for example via intermediate devices. Accordingly, unless implied or stated otherwise the connections may for example be direct connections or indirect connections.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

The term "program," as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

It is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediary components. Likewise, any two components so associated can also be viewed as being "operably connected," or "operably coupled," to each other to achieve the desired functionality.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative examples may include multiple instances of a particular operation, and the order of operations may be altered in various other examples.

All or some of the software described herein may be received from computer readable media. Such computer readable media may be permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

In one example, electronic device 500 may comprise a computer system such as a personal computer system. Other examples may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

A computer system processes information according to a program and produces resultant output information via I/O devices. A program is a list of instructions such as a particular application program and/or an operating system. A computer program is typically stored internally on computer readable storage medium or transmitted to the computer system via a computer readable transmission medium. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Also, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device. Also, devices functionally forming separate devices may be integrated in a single physical device. Other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. An integrated circuit comprising:
 a deflicker unit for adaptively applying deflicker filtering to image data to be displayed using an interlaced scan line technique, the deflicker unit comprising:
  analysis unit arranged to receive the image data and identify at least one region of an image to which deflicker filtering is to be applied; and
  a filter arranged to adaptively apply deflicker filtering to only those regions identified by the analysis unit;
  wherein the analysis unit is arranged to identify the at least one region of an image to which deflickering is to be applied based on an analysis of at least:
   a high-frequency range component within a vertical frequency domain of the image data;
   a mid-frequency range component within the vertical frequency domain of the image data; and
   a low-frequency range component within the vertical frequency domain of the image data.

2. The integrated circuit of claim 1 wherein the analysis unit is further arranged to identify at least one region of the image to which deflicker filtering is to be applied based on energy levels for at least one of: the high frequency range component, the mid-frequency range component and the low-frequency range component within the vertical frequency domain of the image data.

3. The integrated circuit of claim 2 wherein the analysis unit further comprises:
 a vertical high-pass filter arranged to filter the image data to produce a signal that is representative of the high-frequency range component within the vertical frequency domain of the image data;
 a vertical mid-pass filter arranged to filter the image data to produce a signal that is representative of a mid-frequency range component within the vertical frequency domain of the image data; and a vertical low-pass filter arranged to filter the image data to produce a signal that is representative of a low-frequency range component within the vertical frequency domain of the image data.

4. The integrated circuit of claim 3 wherein the analysis unit further comprises:

a first comparison unit arranged to compare the energy level for the high-frequency range component within the vertical frequency domain of the image data to at least one first threshold value;

a second comparison unit arranged to compare at least one energy level for the low-frequency range component within the vertical frequency domain of the image data to at least one second threshold value; and a third comparison unit arranged to compare at least one energy level for the mid-frequency range component within the vertical frequency domain of the image data to at least one third threshold value.

5. The integrated circuit of claim 4 wherein the vertical filters comprise non-complimentary filters.

6. The integrated circuit of claim 4 wherein the filter is adapted according to a luminance level of the image data.

7. The integrated circuit of claim 4 wherein the analysis unit further comprises horizontal low-pass filter arranged to horizontally low-pass filter the image data prior to the filtering performed by at least one of the vertical filters.

8. The integrated circuit of claim 4 wherein the analysis unit further comprises mask generator unit arranged to generate deflicker mask information for the image to be displayed based on at least one energy level for the high-frequency range component within the vertical frequency domain of the image data.

9. The integrated circuit of claim 3 wherein the vertical filters comprise non-complimentary filters.

10. The integrated circuit of claim 3 wherein the filter is adapted according to a luminance level of the image data.

11. The integrated circuit of claim 3 wherein the analysis unit further comprises horizontal low-pass filter arranged to horizontally low-pass filter the image data prior to the filtering performed by at least one of the vertical filters.

12. The integrated circuit of claim 3 wherein the analysis unit further comprises mask generator unit arranged to generate deflicker mask information for the image to be displayed based on at least one energy level for the high-frequency range component within the vertical frequency domain of the image data.

13. The integrated circuit of claim 2 wherein the analysis unit further comprises mask generator unit arranged to generate deflicker mask information for the image to be displayed based on at least one energy level for the high-frequency range component within the vertical frequency domain of the image data.

14. The integrated circuit of claim 1 wherein the analysis unit further comprises mask generator unit arranged to generate deflicker mask information for the image to be displayed based on at least one energy level for the high-frequency range component within the vertical frequency domain of the image data.

15. The integrated circuit of claim 14 wherein the mask generator unit is arranged to provide the deflicker mask information to the filter; and the filter is arranged to apply deflicker filtering to the image data in accordance with the received deflicker mask information.

16. The integrated circuit of claim 15 wherein the filter is arranged to subtract an attenuated high-frequency range component from the image data for the at least one region of the image to which deflicker filtering is to be applied, as identified by the analysis unit.

17. The integrated circuit of claim 14 wherein the filter is arranged to subtract an attenuated high-frequency range component from the image data for the at least one region of the image to which deflicker filtering is to be applied, as identified by the analysis unit.

18. The integrated circuit of claim 1 wherein the filter is arranged to subtract an attenuated high-frequency range component from the image data for the at least one region of the image to which deflicker filtering is to be applied, as identified by the analysis unit.

19. An electronic device comprising:

a deflicker unit for applying deflicker filtering to image data to be displayed using an interlaced scan line technique, the deflicker unit comprising:

analysis unit arranged to receive the image data and identify at least one region of an image to which deflicker filtering is to be applied; and a filter arranged to adaptively apply deflicker filtering to only those regions identified by the analysis unit;

wherein the analysis unit is arranged to identify the at least one region of an image to which deflickering is to be applied based analysis of at least:

a high-frequency range component within a vertical frequency domain of the image data;

a mid-frequency range component within the vertical frequency domain of the image data; and a low-frequency component within the vertical frequency domain of the image data.

20. A method for adaptively applying deflicker filtering to image data to be displayed using an interlaced scan line technique, the method comprising:

identifying at least one region of an image to which deflicker filtering is to be applied; and applying deflicker filtering only to the identified at least one region;

wherein the step of identifying the at least one region of an image to which deflickering is to be applied comprises an analysis of at least:

a high-frequency range component within a vertical frequency domain of the image data;

a mid-frequency range component within the vertical frequency domain of the image data; and a low-frequency component within the vertical frequency domain of the image data.

* * * * *